United States Patent [19]

Sato

[11] Patent Number: 5,012,884
[45] Date of Patent: May 7, 1991

[54] ANTILOCK BRAKING METHOD AND APPARATUS FOR A FOUR-WHEEL DRIVE VEHICLE

[75] Inventor: Makoto Sato, Wako, Japan

[73] Assignee: Honda Giken Kogyo Kabushiki Kaisha, Tokyo, Japan

[21] Appl. No.: 927,793

[22] Filed: Nov. 5, 1986

[30] Foreign Application Priority Data

Nov. 5, 1985 [JP] Japan ................. 60-247328

[51] Int. Cl.⁵ ................. B60T 8/34; B60T 8/62
[52] U.S. Cl. ................. 180/244; 180/233; 303/111
[58] Field of Search ............. 180/244, 248, 249, 250, 180/197, 233; 303/111, 110, 119, 103, 106; 192/4 A, 13 R

[56] References Cited

U.S. PATENT DOCUMENTS

| 3,046,813 | 7/1962 | Bixby | 192/4 A X |
|---|---|---|---|
| 4,084,672 | 4/1978 | Avins | 192/13 R X |
| 4,456,108 | 6/1984 | Kageyama | 192/4 A |
| 4,466,519 | 8/1984 | Römer | 180/244 X |
| 4,508,393 | 4/1985 | Drometer | 303/111 |
| 4,605,087 | 8/1986 | Ashauer | 180/248 |
| 4,671,373 | 6/1987 | Sigl | 180/197 |
| 4,723,624 | 2/1988 | Kawasaki et al. | 180/248 X |

FOREIGN PATENT DOCUMENTS

| 3015379 | 10/1981 | Fed. Rep. of Germany | 180/244 |
|---|---|---|---|
| 59-179425 | 10/1984 | Japan | 180/248 |
| 60-85052 | 5/1985 | Japan | 303/111 |
| 60-143170 | 7/1985 | Japan | 303/111 |
| 2113332 | 8/1983 | United Kingdom | 303/111 |

Primary Examiner—Mitchell J. Hill
Attorney, Agent, or Firm—Ladas & Parry

[57] ABSTRACT

A four-wheel drive vehicle wherein a power unit is connected to either the front or rear axle, the other axle being connected to the power unit via a torque transmission whose torque transmission rate increases in accordance with increase in the relative rotational speed of the axles. Brakes are provided only on the wheels mounted on the front axle and the wheels on the rear axle are devoid of brakes. An antilock brake system controls the application of the brakes to the wheels on the front axle.

14 Claims, 3 Drawing Sheets

ANTILOCK BRAKING METHOD AND APPARATUS FOR A FOUR-WHEEL DRIVE VEHICLE

BACKGROUND OF THE INVENTION (a) Field of the Invention

This invention relates to an antilock braking method and apparatus for a four-wheel drive vehicle, in which a power unit is connected to one of the front and rear axles, the other axle being connected to the power unit via a torque transmission whose rate of torque transmission increases in accordance with an increase in the relative rotational speed of the axles.

(b) Description of the Prior Art

In a conventional four-wheel drive vehicle, brakes are generally provided on all the wheels mounted on the front and rear axles.

In a vehicle in which one of the front and rear axles is driven by a power unit while the other axle is driven therefrom via a torque transmission, the axles are connected to each other substantially rigidly at all times, so that the axles interfere with each other. Namely, if the brakes are applied to the wheels on one of the axles, especially the front axle which supports a larger load, this has the effect that the brakes are applied to the wheels on both the front and rear axles at once. In the case where the hydraulic braking pressure becomes excessively high when the above-described vehicle having brakes on all the wheels is suddenly braked, all the wheels are locked at once. Therefore, the stability of this vehicle during a braking operation is improved as compared with that of a front wheel drive vehicle or a rear wheel drive vehicle but the problems of a lack of stability with respect to disturbance and a loss of steering capability of the four wheel drive vehicle still remain unsolved. Consequently, it is desirable that the brake system be furnished with antilocking functions.

However, an antilock brake system is basically designed to control the braking torque for each wheel or axle individually and thereby retain a slip ratio for each wheel at a proper level, and it is necessary that the speed of each wheel or axle be varied irrespective of one another. On the other hand, in a vehicle in which the front and rear axles are connected substantially rigidly, these axles interfere or interact with each other. Therefore, it is impossible to provide suitable antilock control for each brake in a conventional vehicle which is provided with a brake on each wheel.

In a vehicle in which the front and rear axles are connected substantially rigidly, upon setting the wheels on one axle with a suitable slip ratio this necessarily causes the slip ratio of the wheels on the other axle to attain substantially the same level.

SUMMARY OF THE INVENTION

An object of the present invention is to provide a four-wheel drive vehicle with a brake system capable of achieving an effective braking effect with a required minimum number of brakes.

To achieve this object, brakes are provided on the wheels on the front axle alone according to the present invention, so that a suitable braking force can be applied to the front and rear wheels by means of minimum number of brakes.

Another object of the present invention is to provide a four-wheel drive vehicle capable of obtaining an excellent antilocking effect with a minimum number of brakes and an accompanying antilock control means.

The above and other objects as well as advantageous features of the invention will become apparent from the following description of a preferred embodiment taken in conjunction with the accompanying drawings.

BRIEF DESCRIPTION OF THE FIGURES OF THE DRAWINGS

The accompanying drawings show an embodiment of the present invention, wherein.

DETAILED DESCRIPTION OF A PREFERRED EMBODIMENT

Figure 1:
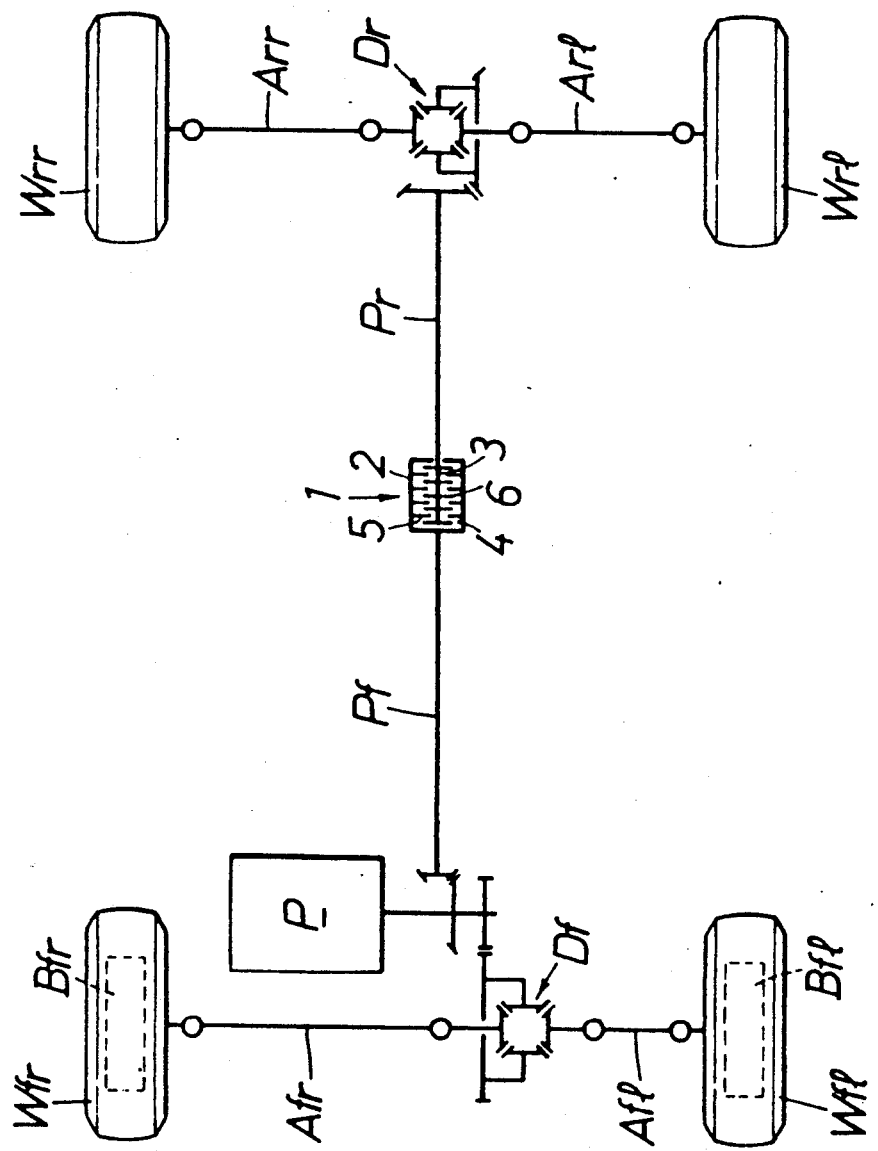
FIG. 1 is a schematic diagram of a driving system.

An embodiment of the present invention will now be described with reference to the accompanying drawing. First, referring to FIG. 1, left and right front wheels Wfl, Wfr and left and right rear wheels Wrl, Wrr are provided at the front d rear portions of a chassis (not shown) of a vehicle.

A pair of front axles Afl, Afr, forming a front axle arrangement, are joined to the left and right front wheels Wfl, Wfr and are connected to each other by a front differential gear Df, while a pair of rear axles Arl, Arr, forming a rear axle arrangement, are joined to the left and right rear wheels Wrl, Wrr and are connected to each other by a rear differential gear Dr. A power unit P including an engine and a transmission is connected to an input portion of the front differential gear Df. A rear propeller shaft Pr is connected to an input portion of the rear differential gear Dr. The rear propeller shaft Pr is connected coaxially to a front propeller shaft Pf via a viscous clutch 1 serving as a torque transmission mechanism. The driving force of the power unit P is transmitted to the front propeller shaft Pf.

The viscous clutch 1 comprises an outer clutch member 2 in the form of a housing and an inner clutch member 3 in the form of a shaft. The inner and outer clutch members can be rotated relative to each other. A sealed oil chamber 4 is formed between the outer clutch member 2 and the inner clutch member 3 and a highly-viscous oil and a small quantity of air which permits the highly-viscous oil to be thermally expanded are sealed in the oil chamber 4. A plurality of outer clutch plates 5 are spline-connected to the outer clutch member 2 and a plurality of inner clutch plates 6 are spline-connected to the inner clutch member 3. The clutch plates 5, 6 are arranged in juxtaposed state and each of the clutch plates 5, 6 is provided with an opening (not shown) which permits the oil to flow therethrough. The outer clutch member 2 is integrally formed with the front propeller shaft Pf, and the inner clutch member 3 is integrally formed with the rear propeller shaft Pr.

When a relative rotational force occurs between the inner and outer clutch members 2, 3 in the viscous clutch 1, the clutch plates 5, 6 are rotated relative to each other as they shear the highly-viscous oil, and a viscous transmission of torque is effected between the clutch plates 5, 6. When the relative rotational speed increases, a complex temperature gradient occurs in the clutch plates 5, 6 due to an increase in the temperature of the oil. Due to the multiplied effect of the strain in the clutch plates, which is caused by this temperature gradient, and an increase in the pressure in the sealed oil chamber 4, a frictionally contacting or extremely slightly separated portion occurs between adjacent clutch plates 5, 6, so that the frictional transmission of torque is effected between the inner and outer clutch members 2, 3.

By virtue of the viscous clutch 1, the front and rear propeller shafts Pf, Pr., i.e. the front and rear axles Afl, Afr; Arl, Arr are connected substantially rigidly at all times, and action on the front and rear wheels Wfl, Wfr; Wrl, Wrr causes interference with the other wheels.

In accordance with the invention, brakes Bfl, Bfr are provided on the wheels having the larger axle load, i.e. the front wheels Wfl, Wfr alone and the rear wheels Wrl, and Wrr are devoid of brakes.

Figure 2:
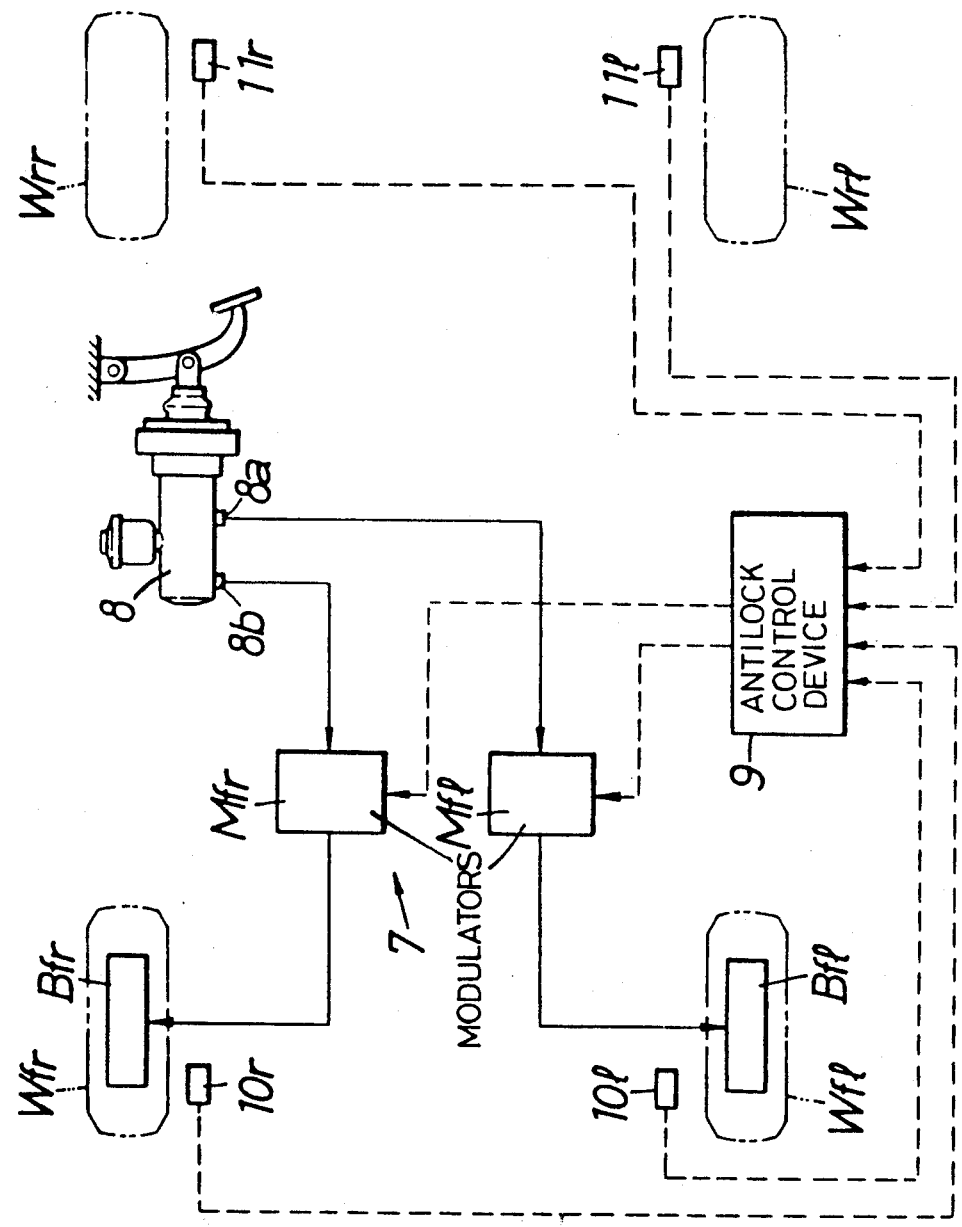
FIG. 2 is a schematic diagram of a brake system.

Referring to FIG. 2, a hydraulic brake system 7 for controlling the hydraulic pressures to the brakes Bfl, Bfr is provided with a tandem type master cylinder 8 having a pair of output ports 8a, 8b, and modulators Mfl, Mfr which are adapted to regulate the hydraulic pressures supplied from the output ports 8a, 8b thereto separately, and feed the resultant hydraulic pressures to the brakes Bfl, Bfr. The hydraulic brake system 7 is additionally provided with an antilock control means 9 adapted to control the operations of the modulators Mfl, Mfr separately and thereby regulate the hydraulic braking pressures of the brakes Bfl, Bfr.

The antilock control means 9 is adapted to receive signals from detectors 10, 10r which detect the speeds of the front wheels Wfl, Wfr, and signals from detectors 11l, 11r which detect the speeds of the rear wheels Wrl, Wrr. The detectors 11l, 11r for the rear wheels Wrl, Wrr may be omitted.

Figure 3:
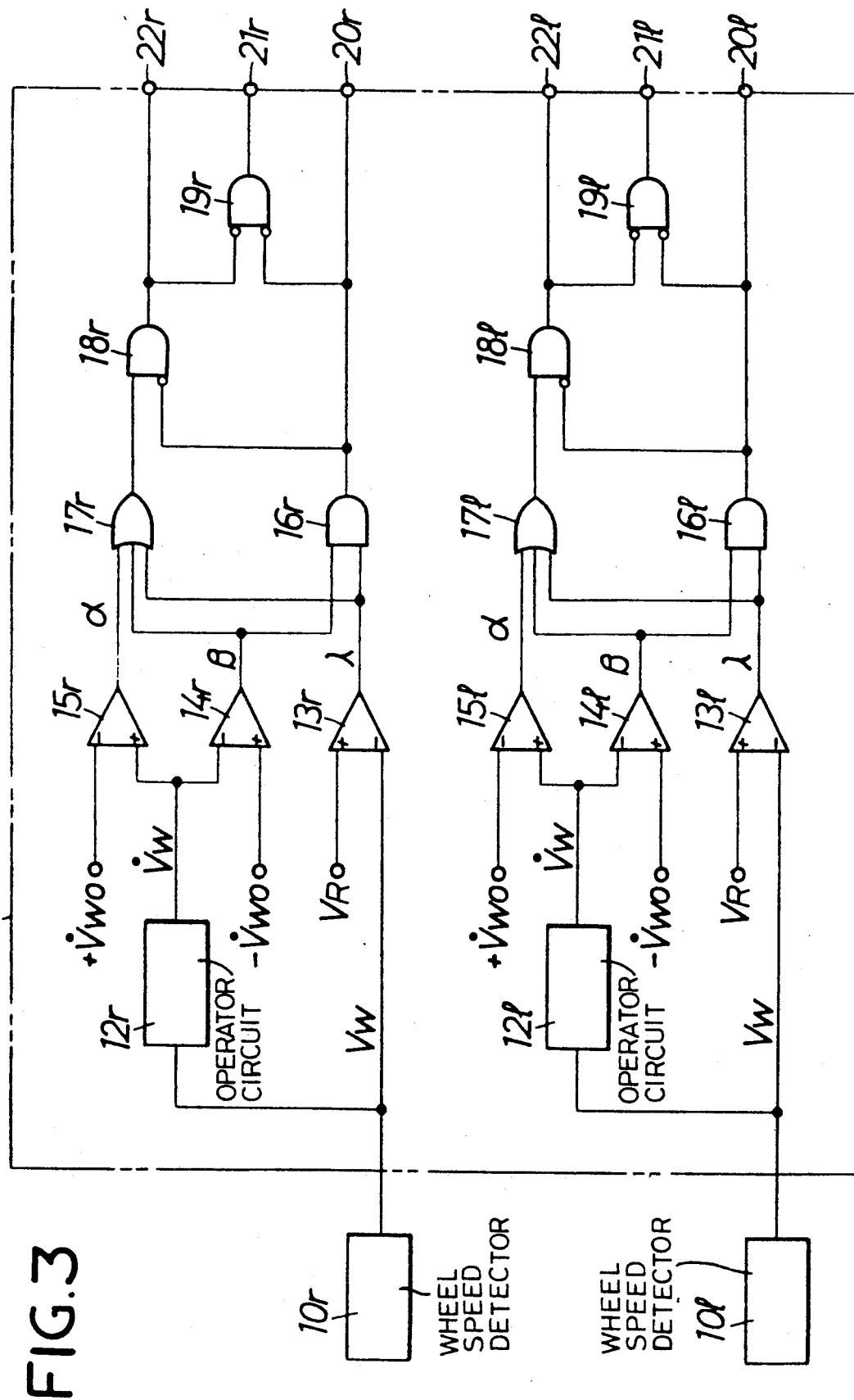
FIG. 3 is a schematic diagram of an antilock control means.

The antilock control means 9 operates to control the modulators Mfl, Mfr separately on the basis of the speeds of the front wheels Wfl, Wfr so as to prevent the wheels Wfl, Wfr from being locked during a braking operation. The antilock control means is contructed as shown in FIG. 3.

The antilock control means 9 comprises one portion corresponding to modulator Mfl, and a second portion corresponding to modulator Mfr, which portions have basically the same construction. The construction of the control means 9 will now be described with reference to the first portion corresponding to modulator Mfl, with the reference letter "l" added to each of the reference numerals associated with the constituent elements whereas the elements of the other protion corresponding to the modulator Mfr will be designated by the addition of reference letter "r" to each of the reference numerals of the elements thereof.

The antilock control means 9 is comprised of a number of interconnected logic elements as will be described hereafter.

In order to determine whether a wheel is about to be locked or not, a wheel speed Vw detected by the detector 10l is fed to a reverse terminal of a first comparator 13l and also to a differentiator circuit 12l. A wheel acceleration signal Vw is obtained from differentiator circuit 12l which is fed to a reverse terminal of a second comparator 14l and a non-reverse terminal of a third comparator 15l. In the first comparator 13l, a reference wheel speed $V_R$ which has been fed to a non-reverse terminal thereof is compared to the wheel speed Vw. When $V_R$ > Vw, a signal λ for reducing the hydraulic braking pressure is supplied at the output of the first comparator 13l. In the second comparator 14l, a reference wheel deceleration −Vwo is fed to a non-reverse terminal thereof and compared to the wheel acceleration Vw. When −Vwo > Vw, a signal β for reducing the hydraulic braking pressure is supplied at the output of the second comparator 14l. In the third comparator 15l, a reference wheel acceleration +Vwo is fed to a reverse terminal thereof and compared to the wheel acceleration Vw. When Vw > +Vwo, a signal α is supplied at the output of the third comparator 15l. The signal α determines whether the wheel speed Vw is increasing or not so that the time for continuing the reduction of the hydraulic braking pressure can be determined.

The output terminal of the first comparator 13l is connected to an input terminal of an AND-gates 16l and also to an input terminal of an OR-gate 17l. The output terminal of the second comparator 14l is connected to the input terminals of the AND-gate 16l and OR-gate 17l. The output terminal of the third comparator 15l is connected to the input terminal of the OR-gate 17l.

The output terminal of the AND-gate 16l is connected to the inverse input terminals of AND-gate 18l, 19l, and also to an output terminal 20l. An output terminal of the OR-gate 17l is connected to a second input terminal of the AND-gate 18l, and an output terminal of the AND-gate 18l is connected to an output terminal 22l and to the inverse input terminal of the AND-gate 19l. The output terminal of the AND-gate 19l is connected to an output terminal 21l.

In the antilock control means 9 thus constructed, signals for reducing the braking pressures are supplied at the output terminals 20l, 20r, signals for increasing the braking pressures from the output terminals 21l, 21r, and signals for maintaining the braking pressures at predetermined levels from the output terminals 22l, 22r. The modulator Mfl is operated in accordance with the signals from the output terminals 20l, 21l, 22l, and the other modulator Mfr in accordance with the signals from the output terminals 20r, 21r, 22r, whereby antilock control of the brakes Bfl, Bfr is effected separately.

The operation of this embodiment will now be described. When the vehicle runs on a regular road surface, the front wheels Wfl, Wfr are driven by the power unit P, and the rear wheels Wrl, Wrr are rotated at the same speed as the front wheels Wfl, Wrr. Accordingly, relative rotation of the inner and outer clutch members does not occur in the viscous clutch 1.

When hydraulic pressures are supplied to the brakes Bfl, Bfr under such running conditions, to apply braking force to the front wheels Wfl, Wfr, relative rotation occurs between the inner and outer clutch members 2 and 3 in the viscous clutch 1, and torque transmission is effected by the viscous clutch 1. Consequently, the braking force is also applied to the rear propeller shaft Pr, i.e. the rear axles Arl, Arr, so that the rear wheels Wrl, Wrr are also braked. Thus, a braking force can be applied to the rear wheels Wrl, Wrr by operating the brakes Bfl, Bfr for the front wheels Wfl, Wrr.

When the hydraulic braking force becomes excessively high during such a braking operation, all the wheels Wfl, Wfr, Wrl, Wrr are locked at once. When the slip ratios of the front wheels Wfl, Wfr are then set to suitable levels by controlling the modulators Mfl, Mfr by the antilock brake means 9, the slip ratios of the rear wheels Wrl, Wrr also necessarily reach suitable levels, so that the locking of the wheels can be prevented.

Moreover, since the modulators Mfl, Mfr are controlled separately by the antilock control means 9, excellent effects can be obtained with respect to the braking distance and running stability. In a four-wheel drive vehicle in which the front wheels Wfl, Wfr and rear wheels Wrl, Wrr are connected substantially rigidly, the control of the front wheels Wfl, Wfr has influence upon the rotation of the rear wheels Wrl, Wrr. Accordingly, in a vehicle employing a high-selectivity system in which two brakes Bfl, Bfr are controlled simultaneously on the basis of the speed of the front wheel which is on the higher speed side, there is the possibility that one of the front wheels can be locked. Moreover, the locking of the front wheel influences the rotation of both of the rear wheels Wrl, Wrr to cause these wheels to slip, so that the running stability of the vehicle is lowered. It is clear that, if a low-selectivity system in which the two brakes Bfl, Bfr are controlled simultaneously on the basis of the lower speed of one of the front wheels, which have a higher load distribution, the braking distance increases.

In the above described embodiment of a four-wheel drive vehicle, the front wheels Wfl, Wfr are driven at all times by the power unit P, however, the present invention can also be applied to a four-wheel drive vehicle in which the rear wheels Wrl, Wrr are driven at all times by the power unit P.

While the invention has been described in relation to a specific embodiment thereof, it would become apparent to those skill in the art that numerous modifications and varieties can be made within the scope and spirit of the invention as defined in the attached claims.

What is claimed is:

1. A four-wheel drive vehicle comprising front and rear axle arrangements, left and right wheels on each axle arrangement, a power unit drivingly connected to one of said front and rear axle arrangements, torque transmission means connected the other of said axle arrangements to said power unit, said torque transmission means being capable of transmitting torque between the front and rear axle arrangements which increase in accordance with increase in relative rotational speed of said front and rear axle arrangements, brakes on the wheels mounted on said front axle arrangements, the wheels mounted on the rear axle arrangements being devoid of brakes, means for applying force to the said brakes to cause said brakes to apply braking pressure to said wheels on the front axle arrangement, and means connected said front and rear axle arrangements to one another through said torque transmission means such that when braking force is applied to the brakes on the wheels on the front axle arrangement, braking action will be applied to the rear axle arrangement via said torque transmission means.

2. A four-wheel drive vehicle as claimed in claim 1 wherein said means for applying force to the brakes includes a hydraulic braking system for applying hydraulic braking pressure to said brakes.

3. A four-wheel drive vehicle as claimed in claim 2 wherein said hydraulic braking system includes antilock control means for separately controlling the hydraulic braking pressure supplied to the brakes of the left and right wheels on the front axle arrangement.

4. A four-wheel drive vehicle as claimed in claim 3 wherein said hydraulic braking system further comprises a separate modulator for each brake of the associated wheel on the front axle.

5. A four-wheel drive vehicle as claimed in claim 4 wherein said antilock control means includes a speed sensor for each wheel on the front axle arrangement and a control section associated with each wheel on the front axle arrangement including logic elements connected to a respective speed sensor to determine wheel locking.

6. A four-wheel drive vehicle as claimed in claim 5 wherein said control section is connected to said modulators.

7. A four-wheel drive vehicle as claimed in claim 1 wherein said torque transmission means comprises a viscous clutch.

8. A method of controlling the braking of a four-wheel drive vehicle having front and rear axle arrangements at all times connected together for front and rear drive from a power unit, said method comprising applying braking pressure to the wheels on one of the axle arrangements during a braking operation while the wheels on the other axle arrangement are devoid of brakes and left free so that no braking pressure is directly applied by brakes thereto and wherein during the applying of braking pressure to the wheels on said one of the axle arrangements, a connection of said front and rear axle arrangements is utilized for subjecting the said other axle arrangement to braking action while permitting a predetermined relative rotation between the front and rear axle arrangements.

9. A method as claimed in claim 8 wherein the drive connection of the axle arrangements includes driving said other axle arrangement from said power unit via a viscous clutch.

10. A method as claimed in claim 9 wherein said one axle is the front axle arrangement, the rear axle arrangement being driven via said viscous clutch.

11. A method as claimed in claim 8 comprising controlling application of braking pressure to the wheels on said one of the axle arrangements such that said wheels on said one of the axle arrangements will not become locked.

12. A method as claimed in claim 8 wherein said one of the axle arrangements is the front axle arrangement, said method further comprising detecting locking of the brakes on the wheels on the front axle arrangement and modulating the braking pressure to the wheel on the front axle arrangement whose locking is detected.

13. A method as claimed in claim 12 wherein said locking is detected on the basis of measuring the speed of the wheels.

14. A method as claimed in claim 12 wherein locking of each of the wheels on the front axle arrangement is separately detected by measuring the speed of the respective wheel.

* * * * *